(12) United States Patent
Routh et al.

(10) Patent No.: US 12,385,263 B2
(45) Date of Patent: Aug. 12, 2025

(54) COMPENSATION WALER ASSEMBLY

(71) Applicant: PERI SE, Weissenhorn (DE)

(72) Inventors: Anibrata Routh, Mumbai (IN); Arun Kunnathally Somasundaram, Mumbai (IN); Sitarama Rao Naga Venkata Challa, Mumbai (IN); Mahesh Dongare, Mumbai (IN); Ankush Rathod, Mumbai (IN); Vinothkumar Raju, Mumbai (IN)

(73) Assignee: PERI SE, Weissenhorn (DE)

( * ) Notice: Subject to any disclaimer, the term of this patent is extended or adjusted under 35 U.S.C. 154(b) by 859 days.

(21) Appl. No.: 17/609,759

(22) PCT Filed: May 4, 2020

(86) PCT No.: PCT/EP2020/062315
§ 371 (c)(1),
(2) Date: Nov. 8, 2021

(87) PCT Pub. No.: WO2020/225209
PCT Pub. Date: Nov. 12, 2020

(65) Prior Publication Data
US 2022/0228382 A1 Jul. 21, 2022

(30) Foreign Application Priority Data
May 7, 2019 (IN) .............. 201911018268

(51) Int. Cl.
*E04G 17/04* (2006.01)
*E04G 9/02* (2006.01)
(Continued)

(52) U.S. Cl.
CPC .............. *E04G 17/04* (2013.01); *E04G 9/02* (2013.01); *E04G 9/04* (2013.01); *E04G 11/08* (2013.01);
(Continued)

(58) Field of Classification Search
CPC ......... E04G 17/04; E04G 17/047; E04G 9/02; E04G 11/08; E04G 2009/028; E04G 13/025; F16B 5/06
See application file for complete search history.

(56) References Cited

U.S. PATENT DOCUMENTS 1,350,084 A    8/1920   Schub
RE16,736 E  *  9/1927   McMillan ............. E04G 13/025
                                                         269/121
(Continued)

FOREIGN PATENT DOCUMENTS

CA    2179084 A1   12/1997
CH     311730 A    12/1955
(Continued)

*Primary Examiner* — Gisele D Ford
(74) *Attorney, Agent, or Firm* — SLEMAN & LUND LLP

(57) ABSTRACT

A compensation waler assembly (400) for connecting and aligning a pair of formwork panels (200) with each other is disclosed. The compensation waler assembly (400) includes a first bar (702-1), a second bar (702-2) disposed above the first bar (702-1), and a pair of hook sub-assemblies (704) disposed between the first bar (702-1) and the second bar (702-2). Each hook sub-assembly (704) is adapted to be engaged with one of the pair of formwork panels (200). Each hook sub-assembly (704) includes a hook-shaped portion (902) formed at one end of the hook sub-assembly (704) and adapted to be removably engaged with a slot formed in the respective formwork panel (200). The hook sub-assembly (704) further includes a distal portion (904) formed at the opposite end of the hook sub-assembly (704) and comprising a slot (706), and a locking component (708) adapted to be accommodated in the slot (706) to secure the hook sub-assembly (704) on the respective formwork panel (200).

9 Claims, 6 Drawing Sheets

(51) Int. Cl.
*E04G 9/04* (2006.01)
*E04G 11/08* (2006.01)
*F16B 5/06* (2006.01)

(52) U.S. Cl.
CPC .............. *E04G 17/045* (2013.01); *F16B 5/06* (2013.01); *E04G 2009/028* (2013.01)

(56) References Cited

U.S. PATENT DOCUMENTS

| | | | |
|---|---|---|---|
| 1,674,280 A * | 6/1928 | Eklof | E04G 13/025 |
| | | | 269/122 |
| 1,987,076 A * | 1/1935 | Pulis | E04G 17/045 |
| | | | 249/219.1 |
| 2,341,993 A | 2/1944 | Jennings | |
| 2,526,529 A * | 10/1950 | Arrighini | E04G 11/10 |
| | | | 269/121 |
| 2,862,277 A * | 12/1958 | Hillberg | E04G 11/087 |
| | | | 249/219.2 |
| 3,121,277 A * | 2/1964 | Dusselier | E04G 17/047 |
| | | | 249/40 |
| 3,137,052 A * | 6/1964 | Jennings | E04G 17/04 |
| | | | 403/398 |
| 3,550,898 A | 12/1970 | Ursini | |
| 3,712,576 A | 1/1973 | Dagiel | |
| 4,886,234 A * | 12/1989 | Schworer | E04G 17/04 |
| | | | 249/47 |
| 5,039,059 A | 8/1991 | Miller | |
| 5,160,640 A | 11/1992 | Badstieber | |
| 5,552,103 A * | 9/1996 | Lee | E04G 17/14 |
| | | | 249/47 |
| 5,562,845 A | 10/1996 | Miller | |
| 5,620,628 A * | 4/1997 | Ritchie, IV | E04G 11/087 |
| | | | 249/47 |
| 6,361,014 B1 * | 3/2002 | Lopez | E04G 17/042 |
| | | | 249/40 |
| 7,871,055 B1 * | 1/2011 | Dagher | E04G 9/02 |
| | | | 428/113 |
| 8,042,786 B2 | 10/2011 | Spindler | |
| 8,733,727 B2 * | 5/2014 | Vanagan | E04G 17/045 |
| | | | 249/36 |
| 2002/0100857 A1 | 8/2002 | Gallis | |
| 2004/0079859 A1 * | 4/2004 | Ward | E04G 17/06 |
| | | | 249/33 |
| 2004/0079860 A1 | 4/2004 | Ward | |
| 2006/0255236 A1 | 11/2006 | Shidler | |
| 2008/0173788 A1 * | 7/2008 | Brewka | E04G 17/002 |
| | | | 249/189 |
| 2012/0286134 A1 * | 11/2012 | Rojas Pimienta | E04G 11/12 |
| | | | 249/192 |
| 2016/0068301 A1 * | 3/2016 | Mitchell | B65D 11/1833 |
| | | | 24/561 |
| 2016/0319558 A1 | 11/2016 | Lee | |
| 2017/0022724 A1 * | 1/2017 | Laures | E04G 17/14 |
| 2019/0169864 A1 * | 6/2019 | Rosati | E04G 11/08 |
| 2022/0228383 A1 * | 7/2022 | Routh | E04G 17/045 |

FOREIGN PATENT DOCUMENTS

| | | |
|---|---|---|
| CN | 201037314 Y | 3/2008 |
| CN | 201756793 U | 3/2011 |
| CN | 202706551 U | 1/2013 |
| CN | 106193584 A | 12/2016 |
| CN | 208202569 U | 12/2018 |
| DE | 3004395 A1 | 8/1981 |
| DE | 3604252 A1 | 8/1987 |
| DE | 202015006634 U1 | 11/2015 |
| EP | 3144450 A1 | 3/2017 |
| FR | 2429885 A1 | 1/1980 |
| FR | 2484508 A1 | 12/1981 |
| FR | 2607536 A1 | 6/1988 |
| GB | 811383 A | 4/1959 |
| GB | 930579 A | 7/1963 |
| JP | H068601 U | 2/1994 |
| JP | 2000009117 A | 1/2000 |
| JP | 2004156281 A | 6/2004 |
| JP | 2007154504 A | 6/2007 |
| KR | 100860359 B1 | 9/2008 |
| KR | 20080085676 A | 9/2008 |
| KR | 20120067074 A | 6/2012 |
| WO | 03052217 A1 | 6/2003 |
| WO | 2003052217 A1 | 6/2003 |
| WO | 2005042877 A1 | 5/2005 |

* cited by examiner

COMPENSATION WALER ASSEMBLY

FIELD OF THE INVENTION

The present disclosure relates to construction industry and more particularly, relates to a compensation waler assembly adapted to connect and align a pair of formwork panels with each other.

BACKGROUND

In the construction industry, wall forms or panels are generally used as supporting components to form structures, such as columns and walls. Such panels are usually made of wood having a metal frame or made entirely of metal. Based on dimensions and shape of a structure to be formed, multiple panels are installed at a construction site to form a hollow space which would correspond to the dimensions and shape of the structure. In order to form the hollow space, the panels are basically connected to each other by using various connecting mechanisms, such as pins and latches. For example, in case of forming a column, multiple panels may be connected to each other to form a hollow space in between. Thereafter, concrete or any other material may be poured from the top in the hollow space, which would then settle in to take a targeted shape of the column, by the virtue of the dimensions of the hollow space. Over a period of time, the concrete dries out and the panels are then removed to obtain the column so formed.

In case of construction of larger structures, multiple panels are to be connected to each other. Any error in the connection of these panels may lead to falling of the panels causing damage at the construction site. The alignment of these panels with each other is equally critical as any error in the alignment would hamper an overall quality of the structure to be formed. Moreover, these panels are usually manufactured to have predefined dimensions. For example, panels having a dimension of 30"*30" (76.2 cm*76.2 cm) may be used to construct any structure having the dimension in the multiples of 30. However, if a structure having a dimension of 35" has to be constructed, such panels cannot be used. Rather, another panel having a dimension of 35" may have to be manufactured and used for such applications. Such customized manufacturing of these panels is not practical and incurs a significant cost.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a compensation waler assembly for connecting and aligning a pair of formwork panels with each other is disclosed. The compensation waler assembly includes a first bar, a second bar disposed above the first bar, and a pair of hook sub-assemblies disposed between the first bar and the second bar. Each hook sub-assembly is adapted to be engaged with one of the pair of formwork panels. Each hook sub-assembly includes a hook-shaped portion formed at one end of the hook sub-assembly and adapted to be removably engaged with a slot formed in the respective formwork panel. The hook sub-assembly further includes a distal portion formed at the opposite end of the hook sub-assembly and comprising a slot, and a locking component adapted to be accommodated in the slot to secure the hook sub-assembly on the respective formwork panel. The pair of hook sub-assemblies is adapted to be secured on the pair of formwork panels to connect and align the formwork panels with each other.

In an embodiment of the present disclosure, a compensation waler assembly for connecting and aligning a pair of formwork panels with each other is disclosed. The compensation waler assembly includes a first bar, a second bar disposed above the first bar, and a pair of hook sub-assemblies disposed between the first bar and the second bar. Each hook sub-assembly is adapted to be engaged with one of the pair of formwork panels. Each hook sub-assembly includes a hook-shaped portion formed at one end of the hook sub-assembly and adapted to be removably engaged with a slot formed in the respective formwork panel. The hook sub-assembly further includes a distal portion formed at the opposite end of the hook sub-assembly and comprising a slot, and a locking component adapted to be accommodated in the slot to secure the hook sub-assembly on the respective formwork panel. The pair of hook sub-assemblies is adapted to move with respect to each other along the length of the first bar and the second bar, based on dimension adjustment to be made for the pair of formwork panels.

In another embodiment of the present disclosure, a method of connecting and aligning a pair of formwork panels with each other through a compensation waler assembly. The method includes engaging a hook sub-assembly of the compensation waler assembly with each of the pair of formwork panels. The hook sub-assembly is disposed between a first bar and a second bar of the compensation waler assembly. The hook sub-assembly is engaged with the formwork panel by engaging a hook-shaped portion formed at one end of the hook sub-assembly with a slot formed in the respective formwork panel in a removable manner. The method further includes accommodating a locking component of the hook sub-assembly in a slot formed in a distal portion of the hook sub-assembly. The locking component is accommodated to secure the hook sub-assembly on the formwork panel.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
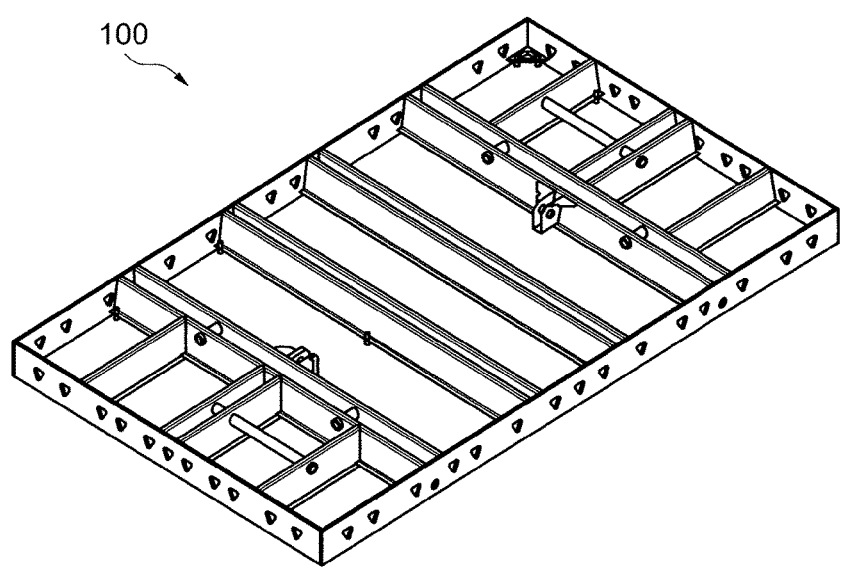
FIG. 1 illustrates a perspective view of a frame of a panel, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. Unless otherwise defined, all technical and scientific terms used herein have the same meaning as commonly understood by one of ordinary skilled in the art to which this invention belongs. The system, methods, and examples provided herein are illustrative only and not intended to be limiting.

For example, the term "some" as used herein may be understood as "none" or "one" or "more than one" or "all." Therefore, the terms "none," "one," "more than one," "more than one, but not all" or "all" would fall under the definition of "some." It should be appreciated by a person skilled in the art that the terminology and structure employed herein is for describing, teaching and illuminating some embodiments and their specific features and elements and therefore, should not be construed to limit, restrict or reduce the spirit and scope of the claims or their equivalents in any way.

For example, any terms used herein such as, "includes," "comprises," "has," "consists," and similar grammatical variants do not specify an exact limitation or restriction, and certainly do not exclude the possible addition of one or more features or elements, unless otherwise stated. Further, such terms must not be taken to exclude the possible removal of one or more of the listed features and elements, unless otherwise stated, for example, by using the limiting language including, but not limited to, "must comprise" or "needs to include."

Whether or not a certain feature or element was limited to being used only once, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language including, but not limited to, "there needs to be one or more . . . " or "one or more element is required."

Unless otherwise defined, all terms and especially any technical and/or scientific terms, used herein may be taken to have the same meaning as commonly understood by a person ordinarily skilled in the art.

Reference is made herein to some "embodiments." It should be understood that an embodiment is an example of a possible implementation of any features and/or elements presented in the attached claims. Some embodiments have been described for the purpose of explaining one or more of the potential ways in which the specific features and/or elements of the attached claims fulfil the requirements of uniqueness, utility, and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or other variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or in the context of more than one embodiment, or in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not necessarily be taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

For the sake of clarity, the first digit of a reference numeral of each component of the present disclosure is indicative of the Figure number, in which the corresponding component is shown. For example, reference numerals starting with digit "1" are shown at least in FIG. 1. Similarly, reference numerals starting with digit "2" are shown at least in FIG. 2.

In an embodiment of the present disclosure, a compensation waler assembly adapted to connect a pair of formwork panels while accommodating any adjustment that has to be made in terms of dimensions of a structure to be formed is disclosed. The compensation waler assembly includes a pair of bars and a pair of hook sub-assemblies disposed between the pair of bars. The pair of bars is disposed on anchor struts of the pair of formwork panels by engaging hook portions of the hook sub-assemblies in slots as provided within the anchor struts. The compensation waler assembly is adapted to operate to adjust for any dimensional limitation of the formwork panels for forming any structure of any dimension.

Figure 2A:
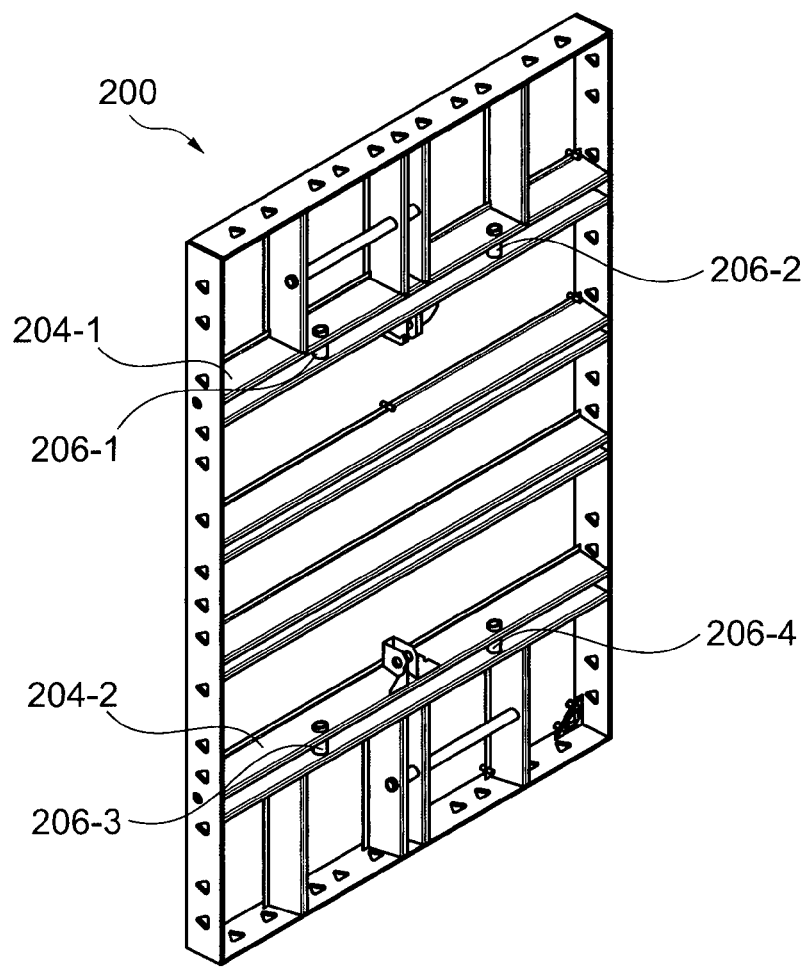
FIG. 2A illustrates a perspective back view of the panel, according to an embodiment of the present disclosure.
Figure 2B:
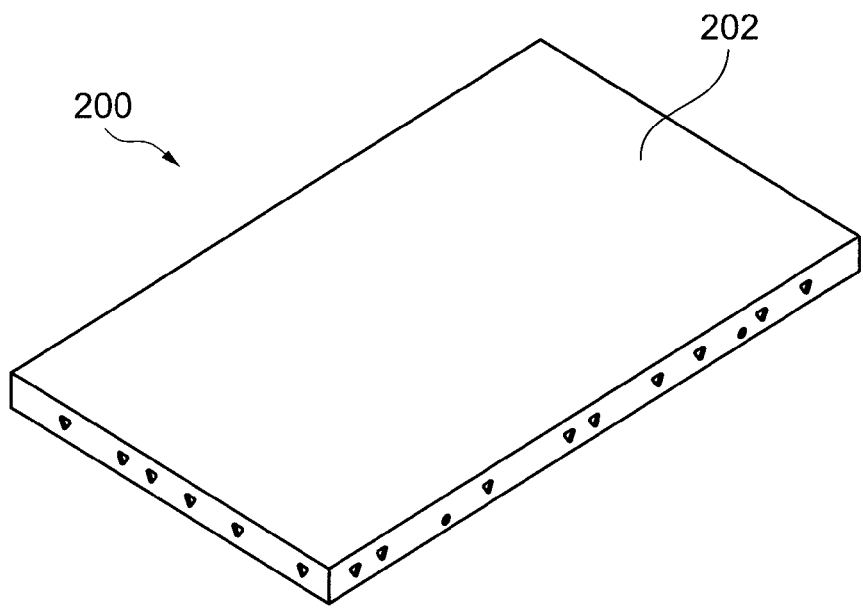
FIG. 2B illustrates a perspective front view of the panel, according to an embodiment of the present disclosure.

FIG. 1 illustrates a perspective view of a frame 100 of a formwork panel, according to an embodiment of the present disclosure. The formwork panel may hereinafter interchangeably be referred to as the panel. FIG. 2A illustrates a perspective back view of the panel 200, according to an embodiment of the present disclosure. FIG. 2B illustrates a perspective front view of the panel 200, according to an embodiment of the present disclosure. FIG. 2A and FIG. 2B may hereinafter collectively be referred to as FIG. 2. In order to avoid duplicity of information, FIG. 1 and FIG. 2 are explained in conjunction with each other. In an embodiment, the panel 200 may be adapted to be used for construction of structures, such as walls and columns.

Although the present disclosure is explained with respect to application of the panel 200 in the field of construction, the application of the panel 200 should not be construed to be limited to the construction industry only. In fact, the panel 200 can be used in any other application, without departing from the scope of the present disclosure.

In an embodiment, the panel 200 may include, but is not limited to, the frame 100 and a flat portion 202 fixed to the frame 100. The flat portion 202 may come in contact with concrete or any other variant during the construction of the structure. Therefore, the shape or profile of the flat portion 202 may depend on the profile of the structure to be formed. In an embodiment, the flat portion 202 may be formed of at least one of composite ply-board, Birch ply-board, a polypropylene board, and local ply-board. In an embodiment, the flat portion 202 may interchangeably be referred to as form-lining, without departing from the scope of the present disclosure. In an example, the flat portion 202 may have a thickness of 12-13 mm. Further, the flat portion 202 may be conveniently replaced at the construction site.

Further, the frame 100 may be formed of high-grade steel. In an embodiment, the frame 100 may include at least one anchor strut 204. In the illustrated embodiment, the frame 100 includes a pair of anchor struts 204, individually referred to as 204-1 and 204-2. Each anchor strut 204 may have a plurality of support pillars 206 for accommodating mounting of a compensation waler assembly to connect multiple frames and adjust to the extra dimensions of the structure to be formed. In an example, the support pillars 206 may be cylindrical in shape. The support pillars 206 may individually be referred to as 206-1, 206-2, 206-3, and 206-4. Constructional and operational details of the compensation waler assembly are explained in detail in the description of subsequent Figures. The anchor struts 204 may also have edge stiffening for extra robustness.

Figure 3A:
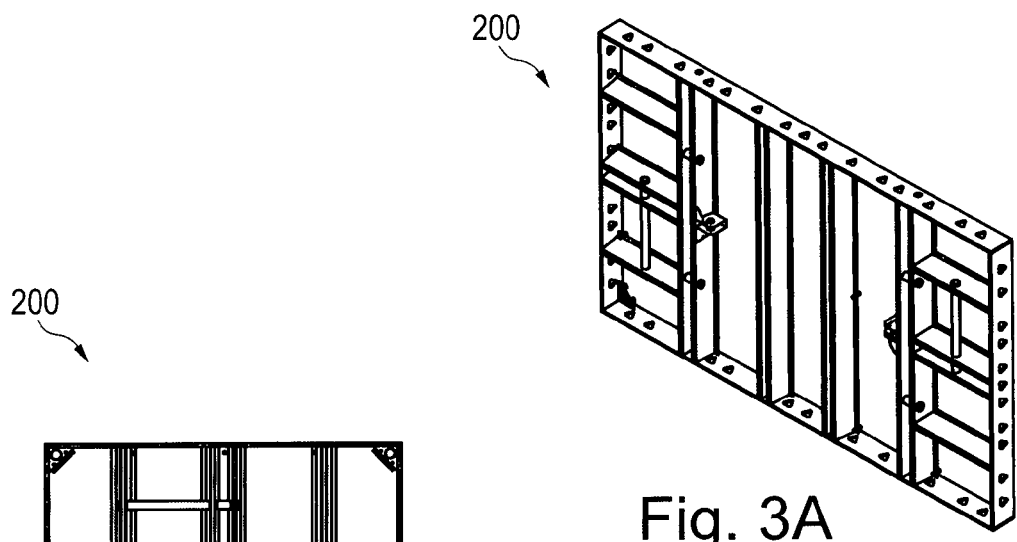
FIG. 3A illustrates another perspective back view of the panel, according to an embodiment of the present disclosure.
Figure 3B:
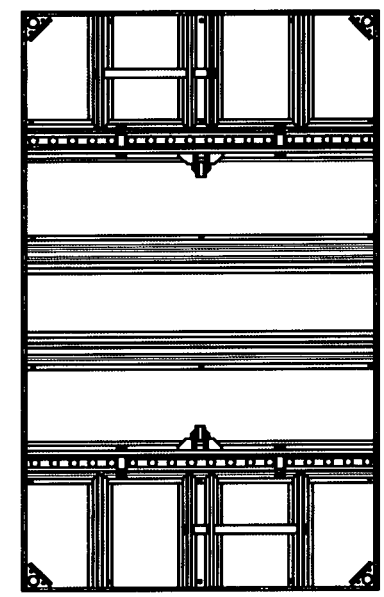
FIG. 3B illustrates a back view of the panel, according to an embodiment of the present disclosure.
Figure 3C:
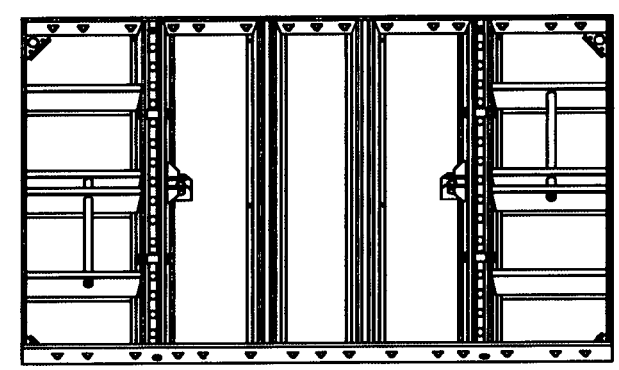
FIG. 3C illustrates another perspective back view of the panel, according to an embodiment of the present disclosure.

FIG. 3A illustrates another perspective back view of the panel 200, according to an embodiment of the present disclosure. FIG. 3B illustrates a back view of the panel 200, according to an embodiment of the present disclosure. FIG. 3C illustrates another perspective back view of the panel 200, according to an embodiment of the present disclosure. FIG. 3A, FIG. 3B, and FIG. 3C may hereinafter collectively be referred to as FIG. 3.

Referring to FIG. 1, FIG. 2, and FIG. 3, in an embodiment, a total weight of the panel 200 may vary within a range of 40 kg to 50 kg. Further, in an example, maximum column size that can be formed using the panel 200 is 900 mm×900 mm, for example, by using four panels 200 having width of 900 mm. Further, a design pressure of 60 kN/Sq·m and 75 kN/Sq·m may be applicable for the construction of the walls and the columns, respectively, by using the panel 200 of the present disclosure.

Figure 4:
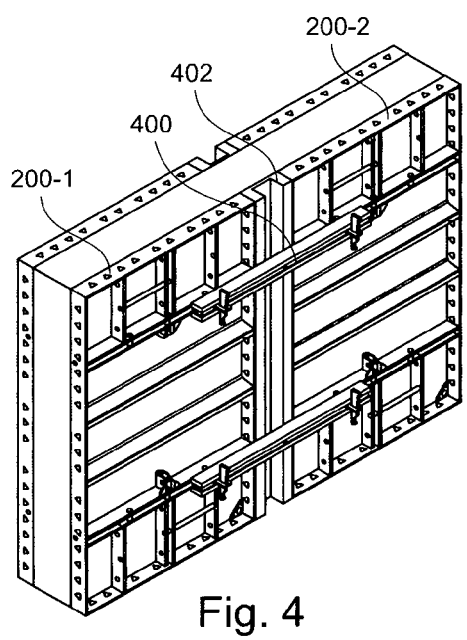
FIG. 4 illustrates a perspective view of a pair of panels inter-connected by a compensation waler assembly, according to an embodiment of the present disclosure.
Figure 5:
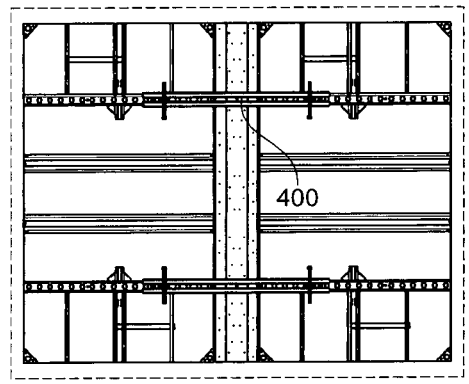
FIG. 5 illustrates a front view of the pair of panels inter-connected by the compensation waler assembly, according to an embodiment of the present disclosure.
Figure 6:
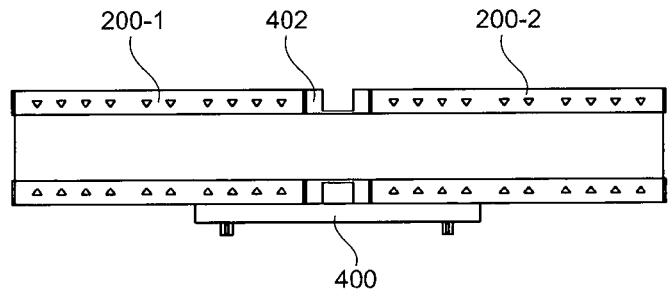
FIG. 6 illustrates a top view of the pair of panels connected by the compensation waler assembly, according to an embodiment of the present disclosure.

FIG. 4 illustrates a perspective view of the pair of panels 200 inter-connected by a compensation waler assembly 400, according to an embodiment of the present disclosure. The compensation waler assembly 400 is adapted to connect the panels 200 in order to accommodate an extra dimensional requirement of a structure to be formed. In an embodiment, the compensation waler assembly 400 may connect the panels 200 with or without infills between them. FIG. 5 illustrates a front view of the pair of panels 200 inter-connected by the compensation waler assembly 400, according to an embodiment of the present disclosure. FIG. 6 illustrates a top view of the pair of panels 200 connected by the compensation waler assembly 400, according to an embodiment of the present disclosure.

Referring to FIG. 4, FIG. 5, and FIG. 6, in an example where a width of each panel 200 is 30 cm and a wall of 65 cm is to be made, the compensation waler assembly 400 may be used. The compensation waler assembly 400 may compensate for the extra 5 cm. As shown in the FIGS. 4-6, in order to compensate for the extra 5 cm, a pair of compensators 402 is disposed between the panels 200-1 and 200-2. Therefore, on each side of the concrete, the two panels 200 of 30 cm each and the compensator 402 of 5 cm may be disposed to form a wall of 65 cm. The pair of compensators 402 may be accommodated between the panels 200-1 and 200-2 owing to the connection by the compensation waler assembly 400. In an embodiment, the pair of compensators 402 is made of timber. It should be appreciated by a person skilled in the art that the dimensions are mentioned merely for explanatory purposes and therefore, should not be construed as limiting in any way.

Figure 7:
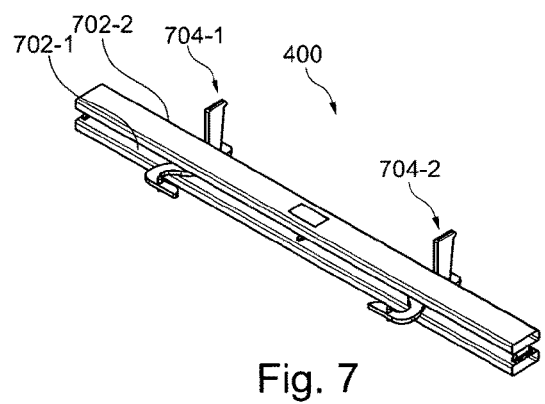
FIG. 7 illustrates a perspective view of the compensation waler assembly, according to an embodiment of the present disclosure.

FIG. 7 illustrates a perspective view of the compensation waler assembly 400, according to an embodiment of the present disclosure. Referring to FIG. 4, FIG. 5, FIG. 6, and FIG. 7, the compensation waler assembly 400 may include, but is not limited to, a pair of bars 702 and a pair of hook sub-assemblies 704 disposed between the pair of bars 702. The pair of bars 702 may individually be referred to as a first bar 702-1 and a second bar 702-2 disposed above the first bar 702-1. Similarly, the pair of hook sub-assemblies 704 may individually be referred to as a hook sub-assembly 704-1 and a hook sub-assembly 704-2. In an embodiment, the hook sub-assemblies 704 may individually be referred to as the hook sub-assembly 704.

Figure 8:
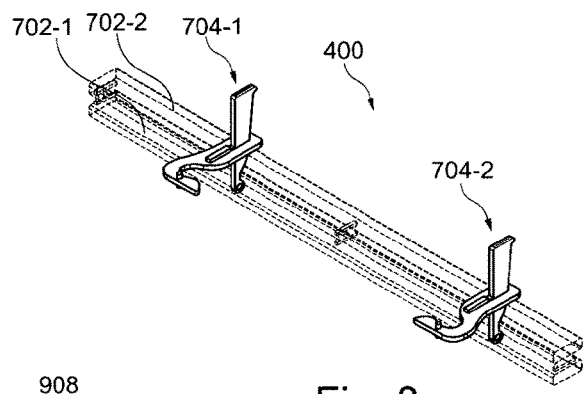
FIG. 8 illustrates a perspective view depicting positioning of a pair of hook sub-assemblies within the compensation waler assembly, according to an embodiment of the present disclosure.

FIG. 8 illustrates a perspective view of the compensation waler assembly 400 depicting positioning of the hook sub-assemblies 704 within the compensation waler assembly 400, according to an embodiment of the present disclosure.

Figure 9:
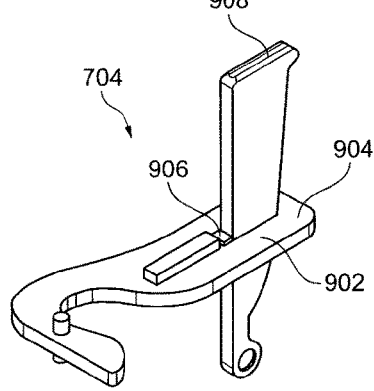
FIG. 9 illustrates a perspective view of a hook sub-assembly, according to an embodiment of the present disclosure.

FIG. 9 illustrates a perspective view of a hook sub-assembly 704, according to an embodiment of the present disclosure. Referring to FIG. 7, FIG. 8, and FIG. 9, each hook sub-assembly 704 is adapted to be engaged with one of the pair of panels 200. The subsequent description is explained with respect to one of the hook sub-assemblies 704. However, as would be appreciated by a person skilled in the art, the description is equally application to both the hook sub-assemblies 704, without departing from the scope of the present disclosure.

Referring to FIGS. 4-9, the hook sub-assembly 704 may include, but is not limited to, a hook-shaped portion 902 formed on one end and a distal portion 904 formed at the opposite end. The hook-shaped portion 902 is adapted to be engaged with a slot formed in the respective panel 200. The slot may be any supporting structure of the panel 200 that is adapted to engage the hook-shaped portion 902. In an embodiment, the hook-shaped portion 902 may be adapted to engage with the anchor strut 204 of the panel 200. Particularly, the hook-shaped portion 902 may be adapted to engage with the support pillar 206 of the anchor strut 204. Further, the distal portion 904 may include a slot 906. The hook sub-assembly 704 may further include a locking component 908 adapted to be accommodated in the slot 906 to secure the hook-sub-assembly 704 on the respective panel 200. In an embodiment, the locking component 908 may include, but is not limited to, a wedge and a bolt. As would be appreciated by a person skilled in the art, the locking component 908 may be selected based on the constructional characteristics of the slot 906 and may be of any form that can achieve effective locking.

Therefore, the bars 702 may be disposed on the anchor struts 204 of the panels 200, for example, by engaging the hook-shaped portions 902 of the hook sub-assemblies 704 with a corresponding component of the anchor struts 204. The hook sub-assemblies 704 are therefore adapted to be secured on the panels 200 to connect and align the panels 200 with each other.

In an embodiment, as illustrated, the hook sub-assembly 704 is disposed between the bars 702 such that the hook-shaped portion 902 and the distal portion 904 are extended out of the bars 702. Moreover, in an embodiment, the hook sub-assemblies 704 are adapted to move with respect to each other along the length of the bars 702. The hook sub-assemblies 704 may be moved based on dimension adjustment to be made for the panels 200. Therefore, the hook sub-assemblies 704 move to accommodate the extra dimension of the structure to be formed, with respect to the dimensions of the panels 200. For example, the hook sub-assemblies 704 may be moved farther away from each other to accommodate an increase in the extra dimensions.

In an embodiment, the hook-shaped portion 902 may be adapted to rotate for aligning to engage with any supporting portion of the panel 200. In an embodiment, the hook-shaped portion 902 may be adapted to rotate by 360 degrees. In such an embodiment, the construction of the hook-shaped portion 902 may be different from the illustrated embodiment, for example, in order to accommodate the rotation aspect. Owing to the rotatable aspect of the hook-shaped portion 902, the compensation waler assembly 400 may be adapted to align itself with any surface, for example, with supporting elements of the anchor struts 204. Therefore, the compensation waler assembly 400 may be installed in any alignment based on the joint to be formed between the panels 200.

Figure 10:
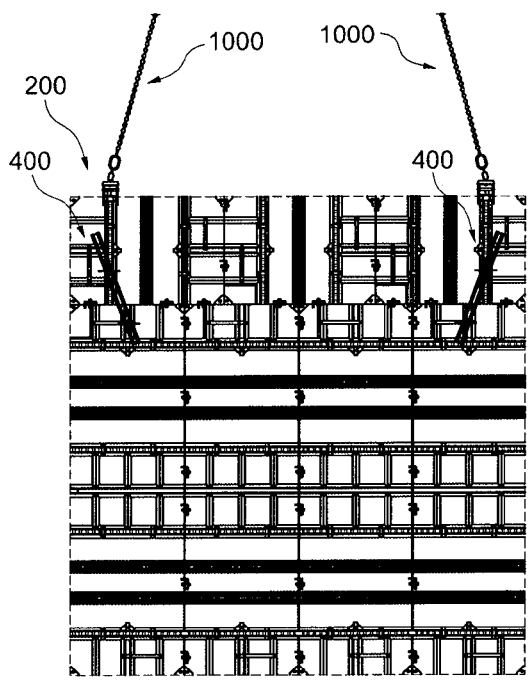
FIG. 10 illustrates a schematic view of connection and alignment of vertically aligned panels with horizontally aligned panels by a plurality of compensation waler assemblies, according to an embodiment of the present disclosure.
Figure 11:
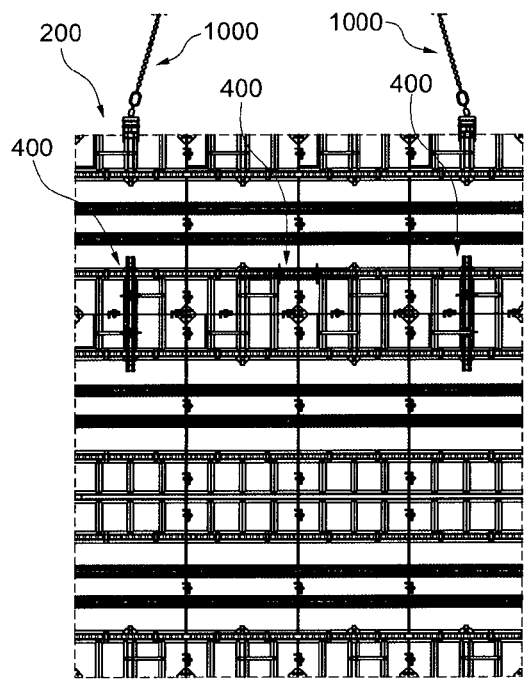
FIG. 11 illustrates a schematic view of connection and alignment of the vertically aligned panels with the horizontally aligned panels by a plurality of compensation waler assemblies, according to another embodiment of the present disclosure.

In an embodiment, the compensation waler assembly 400 may be adapted to connect a vertically aligned panel 200 with a horizontally aligned panel 200. FIG. 10 illustrates a schematic view of connection and alignment of vertically aligned panels 200 with the horizontally aligned panels 200 by a plurality of compensation waler assemblies 400, according to an embodiment of the present disclosure. Similarly, FIG. 11 illustrates a schematic view of connection and alignment of vertically aligned panels 200 with the horizontally aligned panels 200 by a plurality of compensation waler assemblies 400, according to another embodiment of the present disclosure. Referring to FIG. 10 and FIG. 11, the connected formwork panels 200 are shown to be lifted through chains 1000 of a crane or any other similar heavy machine. As illustrated, the compensation waler assembly 400 is also capable of connecting and aligning the vertically aligned panels 200 with horizontally aligned panels 200. In an example, the compensation waler assembly 400 may be inclined up to 12 degrees in order to enable such connections. This would provide additional robustness to the structure, and avoid the possibility of any misalignment of the panel structure during transportation.

In an embodiment, a method of connecting and aligning the pair of formwork panels 200 with each other through the compensation waler assembly 400 is also disclosed. The method may include, but is not limited to, engaging the hook sub-assembly 704 with each of the pair of formwork panels 200. The hook sub-assembly 704 is engaged with the formwork panel 200 by engaging the hook-shaped portion 902 formed at one end of the hook sub-assembly 704 with the slot formed in the respective formwork panel 200 in a removable manner. Further, the method includes accommodating the locking component 908 of the hook sub-assembly 704 in the slot 906 formed in the distal portion 902. The locking component 908 is accommodated to secure the hook sub-assembly 704 on the formwork panel 200.

As would be gathered, the panel 200 and the compensation waler assembly 400 of the present disclosure offer a comprehensive approach for construction of the structures, such as walls and columns. Firstly, owing to the use of high-grade steel for the frame 100 and corresponding supporting beams, the panels 200 so formed are robust. Further, the form-lining or the flat portion 202 of the panel 200 ensures best form finish of the structure formed. Considering the convenience of assembling and disassembling the panels 200, time taken for forming the structure is also significantly reduced.

In an embodiment, by using the panel 200 and the compensation waler assembly 400 of the present disclosure, any wall or column of varying dimensions can be conveniently formed. For constructing a structure, firstly, a form release agent may be sprayed on the equipment so that the concrete does not stick to any of the equipment. After the spraying, a number of panels 200 may be placed in conjunction with each other, based on dimensions of the structure to be formed. The panels 200 may be connected to each other by using the compensation waler assembly 400. Particularly, when any adjustment is required with respect to the dimensions of the structure and the panels 200, the compensation waler assembly 400 may be used to compensate for the difference in dimensions.

The compensation waler assembly 400 has a simple structure and includes fewer components. Further, the compensation waler assembly 400 is formed such that it can be conveniently engaged with any surface of the panels 200. Instead of requiring an interface component for enabling the connection between the panel 200 and the compensation waler assembly 400, the hook-shaped portion 902 is formed such that it can directly engage with any supporting structure of the panel 200. Moreover, it does not require any complicated and expensive fastening system to secure the connection. The hook-shaped portion 902 is structured such that it easily engages with the panel 200, without requiring any specialized tool.

By providing simple and durable construction of the compensation waler assembly 400, an overall strength and rigidity to the structure are ensured. Moreover, the compensation waler assembly 400 can be easily installed and uninstalled at the site. Therefore, the panel 200 and the compensation waler assembly 400 of the present disclosure are safe, risk-free, flexible in implementation, cost-effective, convenient, easy to install and uninstall, and have a wide range of applications.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A compensation waler assembly for connecting and aligning a pair of formwork panels with each other, the compensation waler assembly comprising:
   a first bar;
   a second bar disposed above the first bar; and
   a pair of hook sub-assemblies disposed between the first bar and the second bar, each hook sub-assembly adapted to be engaged with one of the pair of formwork panels, and each hook sub-assembly comprising:
      a hook-shaped portion formed at one end of the hook sub-assembly and adapted to be removably engaged with a first slot formed in the respective formwork panel;
      a distal portion formed at the opposite end of the hook sub-assembly and comprising a second slot; and
      a locking component adapted to be accommodated in the second slot to secure the hook sub-assembly on the respective formwork panel,
   wherein the pair of hook sub-assemblies is adapted to be secured on the pair of formwork panels to connect and align the formwork panels with each other; and
   wherein the hook-shaped portion is adapted to rotate by 360 degrees for aligning to engage with any supporting portion of the formwork panel.

2. The compensation waler assembly of claim 1, wherein each hook sub-assembly is disposed between the first bar and the second bar such that the respective hook-shaped portion and the respective distal portion are extended out of the first bar and the second bar.

3. The compensation waler assembly of claim 1, wherein the pair of hook sub-assemblies is adapted to move with respect to each other along the length of the first bar and the second bar, based on dimension adjustment to be made for the pair of formwork panels.

4. The compensation waler assembly of claim 1, wherein the hook-shaped portion of the hook sub-assembly is adapted to be engaged with an anchor strut of the formwork panel.

5. The compensation waler assembly of claim 1, wherein the hook-shaped portion of the hook sub-assembly is adapted to be engaged with a support pillar of an anchor strut of the formwork panel.

6. A compensation waler assembly for connecting and aligning a pair of formwork panels with each other, the compensation waler assembly comprising:
   a first bar;
   a second bar disposed above the first bar; and
   a pair of hook sub-assemblies disposed between the first bar and the second bar, each hook sub-assembly adapted to be engaged with one of the pair of formwork panels, and each hook sub-assembly comprising:
      a hook-shaped portion formed at one end of the hook sub-assembly and adapted to be removably engaged with a first slot formed in the respective formwork panel;
      a distal portion formed at the opposite end of the hook sub-assembly and comprising a second slot; and
      a locking component adapted to be accommodated in the second slot to secure the hook sub-assembly on the respective formwork panel,
   wherein the pair of hook sub-assemblies is adapted to move with respect to each other along the length of the first bar and the second bar, based on dimension adjustment to be made for the pair of formwork panels, and
   wherein the hook-shaped portion is adapted to rotate by 360 degrees for aligning to engage with any supporting portion of the formwork panel.

7. The compensation waler assembly of claim 6, wherein the hook-shaped portion of the hook sub-assembly is adapted to be engaged with an anchor strut of the formwork panel.

8. The compensation waler assembly of claim 6, wherein the hook-shaped portion of the hook sub-assembly is adapted to be engaged with a support pillar of an anchor strut of the formwork panel.

9. A method of connecting and aligning a pair of formwork panels with each other through a compensation waler assembly, the method comprising:
   engaging a hook sub-assembly of the compensation waler assembly with each of the pair of formwork panels, wherein the hook sub-assembly is disposed between a first bar and a second bar of the compensation waler assembly, the hook sub-assembly is engaged with the formwork panel by:
      engaging a hook-shaped portion formed at one end of the hook sub-assembly with a first slot formed in the respective formwork panel in a removable manner; and
      accommodating a locking component of the hook sub-assembly in a second slot formed in a distal portion of the hook sub-assembly,
   wherein the locking component is accommodated to secure the hook sub-assembly on the respective formwork panel,
   wherein the hook-shaped portion is adapted to rotate by 360 degrees for aligning to engage with any supporting portion of the formwork panel.

* * * * *